(12) United States Patent
Bredt et al.

(10) Patent No.: US 10,507,639 B2
(45) Date of Patent: *Dec. 17, 2019

(54) MODULAR PRINTING APPARATUS FOR 3D PRINTING

(71) Applicant: 3DBotics, Inc., Dearborn, MI (US)

(72) Inventors: James F Bredt, Watertown, MA (US); Katie R. Passino, Boston, MA (US)

(73) Assignee: 3Dbotics, Inc., Dearborn, MI (US)

( * ) Notice: Subject to any disclaimer, the term of this patent is extended or adjusted under 35 U.S.C. 154(b) by 523 days.

This patent is subject to a terminal disclaimer.

(21) Appl. No.: 15/099,878

(22) Filed: Apr. 15, 2016

(65) Prior Publication Data

US 2016/0303796 A1    Oct. 20, 2016

Related U.S. Application Data

(60) Provisional application No. 62/149,316, filed on Apr. 17, 2015.

(51) Int. Cl.
*B29C 64/112* (2017.01)
*B33Y 30/00* (2015.01)
(Continued)

(52) U.S. Cl.
CPC ............ *B33Y 30/00* (2014.12); *B01L 3/0268* (2013.01); *B29C 64/106* (2017.08);
(Continued)

(58) Field of Classification Search
CPC .... B29C 67/0055; B29C 64/112; B33Y 30/00
See application file for complete search history.

(56) References Cited

U.S. PATENT DOCUMENTS 5,272,491 A * 12/1993 Asakawa ............... B41J 2/1408
165/104.33
5,333,007 A    7/1994 Kneezel et al.
(Continued)

FOREIGN PATENT DOCUMENTS

WO    2013158310 A2    10/2013
WO    2013158310 A3    10/2013
WO    2015041665 A1     3/2015

OTHER PUBLICATIONS

International Search Report and Written Opinion for PCT/US2016/027763 dated Jul. 8, 2016.
(Continued)

*Primary Examiner* — William P Bell
*Assistant Examiner* — Andrew L Swanson
(74) *Attorney, Agent, or Firm* — Hansen IP Law PLLC

(57) ABSTRACT

A printing apparatus including a manifold shaped as a rectangular parallelepiped having three pairs of parallel faces and including (i) a body thereof defining a plurality of fluidic channels, (ii) a bottom portion thereof defining a slot configured to accommodate insertion of a printing element; and (iii) at least one face defining a plurality of fluidic connections in fluidic communication with the fluidic channels. A method for manufacturing a printing apparatus includes the steps of a) manufacturing a manifold by manufacturing a parallelepiped and defining a slot therein configured to hold a printing element; b) machining features into the manifold for mechanical mounting, electronic connection, and fluid connection; and (c) assembling the manifold with the printing element and a gasket to form the printing apparatus.

17 Claims, 7 Drawing Sheets

(51) Int. Cl.
*B01L 3/02* (2006.01)
*B41J 3/54* (2006.01)
*B29C 64/106* (2017.01)
*B41J 3/00* (2006.01)

(52) U.S. Cl.
CPC ............. *B29C 64/112* (2017.08); *B41J 3/00* (2013.01); *B41J 3/543* (2013.01)

(56) References Cited

U.S. PATENT DOCUMENTS

| | | | |
|---|---|---|---|
| 5,956,054 A * | 9/1999 | Hirabayashi | B41J 2/14024 347/37 |
| 8,668,315 B2 | 3/2014 | Tamaki | |
| 2004/0179061 A1 | 9/2004 | Akahane | |
| 2006/0152547 A1 | 7/2006 | Silverbrook et al. | |
| 2007/0179656 A1 * | 8/2007 | Eshed | B29C 67/0059 700/119 |
| 2011/0234713 A1 * | 9/2011 | Tamaki | B41J 2/16526 347/85 |
| 2011/0279560 A1 | 11/2011 | Hibbard et al. | |
| 2014/0168293 A1 * | 6/2014 | Moreau | B41J 2/15 347/2 |

OTHER PUBLICATIONS

Extended European Search Report for EP 16780838.5 dated Jan. 16, 2019.

\* cited by examiner

MODULAR PRINTING APPARATUS FOR 3D PRINTING

RELATED APPLICATION

This application claims the benefit of priority to U.S. Provisional Application Ser. No. 62/149,316 filed Apr. 17, 2015, which is incorporated herein by reference in its entirety.

FIELD

The present disclosure relates generally to three-dimensional printing ("3D printing") and in particular to methods and equipment for 3D printing.

BACKGROUND

Industrial inkjet printing elements, for example, the Q-Series printing element manufactured by Fujifilm/Dimatix, are typically supplied as simple devices made from fragile materials, such as graphite and glass, without standard fluid connections, and with exposed high-voltage electronics and circuit board traces. In use, components that are highly susceptible to corrosion are placed in very close proximity to fluid channels with very simple inlet geometries that provide little or no guarantee against leaks. Electronic connections to a simple edge-connector makes circuit design somewhat easier but provide little protection from contamination from the ambient environment.

Industrial printing elements such as the Q-Series printing element are robust tools for dispensing a variety of liquid inks accurately and reliably, so long as they can be protected from corrosion or mechanical shock.

SUMMARY

A manifold in accordance with the present disclosure is suitable for manipulating Q-Series printing elements in aggressive environments such as those encountered in powder-substrate 3D printing. Powder-substrate 3D printing is described in U.S. Pat. No. 5,204,055, incorporated herein by reference in its entirety. The manifold mates with the fluid inlets of the printing element to allow fluid to be safely channeled through the printhead with standard fluid connections to the outside world. Further, the manifold provides mechanical support and protection by enclosing the printing element in a durable envelope. Further still, the manifold provides points of attachment for mechanical manipulation of the printing element and gasket materials that protect the delicate orifice plate of the printing element.

In one aspect, a manifold design is provided which facilitates a variety of geometric configurations. These enable the manufacture of compact printing arrays with a range of accuracy and many parallel printing channels, e.g., for simultaneously dispensing a two-part reactive resin system or for color printing, using multiple replicas of the same modular parts.

In another aspect, a printing apparatus includes a manifold shaped as a rectangular parallelepiped having three pairs of parallel faces and including (i) a body thereof defining a plurality of fluidic channels, (ii) a bottom portion thereof defining a slot to accommodate insertion of printing element, and (iii) at least one face defining a plurality of fluidic connections in fluidic communication with the fluidic channels.

One or more of the following features may be included. At least one pair of parallel faces may define a non-right angle to at least one other pair of parallel faces. A gasket may be mounted on a bottom surface of the manifold and covering the slot. The printing element may be disposed in the manifold. A plurality of manifolds and printing elements may be included, with the manifolds being stacked on each other to define a stack such that at least one set of parallel faces of each manifold is tilted away from a displacement axis relating the position of one manifold relative to another identical manifold at another location in the stack. Two sets of parallel faces of each manifold may be tilted away from the displacement axis.

The manifold may further define one or more electrical connection slots configured to allow attachment of electrical connections. The electrical connection slots may be arranged on a top face of the parallelepiped opposite the bottom face.

The fluidic connections may be arranged on an end face of the parallelepiped.

A heating element may be mounted inside the manifold, configured to communicate heat to the printing element. The heating element is embedded in the manifold during manufacture of the manifold by a molding process.

A cooling element may be mounted inside the manifold, configured to cool the printing element. The cooling element may be embedded in the manifold during manufacture of the manifold by a molding process.

In another aspect a method for manufacturing a printing apparatus includes manufacturing a manifold by manufacturing a parallelepiped and defining a slot therein configured to hold a printing element. Features are machined into the manifold for mechanical mounting, electronic connection, and fluid connection. The manifold is assembled with the printing element and a gasket to form the printing apparatus. The printing apparatus may be attached to a printer.

DETAILED DESCRIPTION

Figures 1A, 1B:
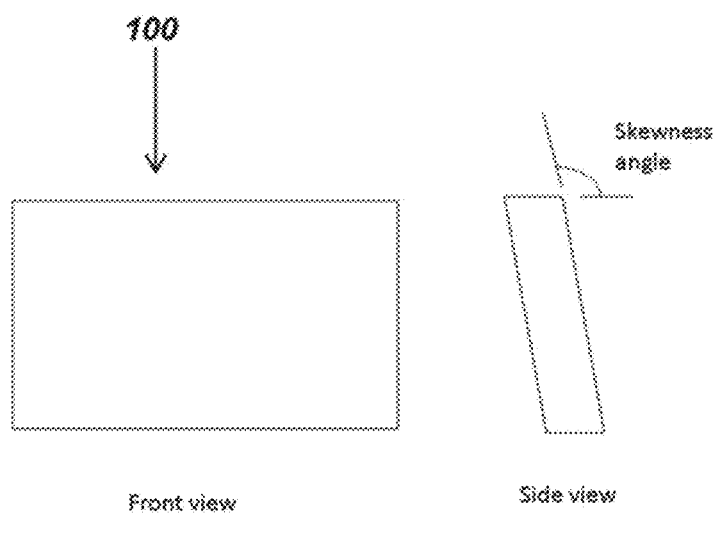
FIGS. 1a and 1b includes two schematic views of a parallelepiped with a single angle of tilt or skewness, the parallelepiped being a shape suitable for a manifold in accordance with the present disclosure.

A 3D printing apparatus typically includes a robotic manipulator that moves a printhead through a reciprocating path over a substrate. The robot may be, for example, an industrial robot such as an IRB 260 robot manufactured by ABB Inc. Alternatively, it may be a manipulator based on a gantry system or an x-y table. As used herein, the printhead may include one or more printing elements that dispense a fluid ink under computer control. These printing elements may be, for example, Q-series printheads from Fujifilm/Dimatix of Lebanon, N.H. In addition, the printhead may include a set of fluid channels that carry the ink from a stationary supply to the moving portion of the printhead, and may also include a secondary ink reservoir that travels with the head and yields a steady supply at a fixed pressure. Further, the printhead includes mounting hardware that holds the printing elements at a fixed orientation relative to the substrate while the robot causes the printing elements to move. Further still, the printhead may include electronic circuits and cables that perform data processing operations that must be performed in close proximity to the printing elements for purposes of noise reduction, timing, or accuracy. In addition, the printhead may include heating or cooling elements to control the temperature of the printing elements.

The mounting hardware that fixes the printing elements to the robot may include a modular element, or manifold, with a slot into which the printing element is inserted to protect it from external contamination or damage. This manifold may include a gasket that covers the orifice plate of the printing element to protect it from external contamination or damage; various fluid fittings to facilitate the supply of ink; fixturing elements such as threaded inserts or studs; and electrical connections to the electronic circuits that supply data to the head.

The manifold is preferably fabricated from a material that is not subject to damage by exposure to the fluid ink. It preferably has channels machined into it to convey ink from fluid fittings to the printing element. A plastic material is preferred, such as polypropylene, nylon, polyvinylidene fluoride ("PVDF"), polytetrafluoroethylene ("PTFE"), polyether ether ketone ("PEEK"), polysulfone, epoxy, and polyvinyl chloride. The manifold may be fabricated from a single piece of material, or it may be formed as a sandwich of several pieces, to facilitate manufacture.

Some embodiments address the need to fabricate printheads by combining several modular manifolds into an array. It may be desirable to fabricate these manifolds in a simple shape so that a small number of products may be held in inventory. The manifolds may be assembled in different orientations, depending on the preferred resolution of a particular assembly. These manifolds may be turned at an oblique angle to the direction of travel in order to gain resolution. Because of size and cost considerations, different degrees of printing resolution may be desired in different applications. Therefore, the manifolds may be manufactured in quantity in a simple shape, and later customized for a particular need by machining mounting surfaces and fastening points appropriate to a particular stacking method best suiting the need. This strategy allows manifolds to be mass-produced more economically with only a small number of more expensive machining steps required late in the process to customize them.

A particular geometric stacking configuration has been developed for a manifold suitable for 3D printing. Referring to FIGS. 1a (front view) and 1b (side view), this geometric stacking is based on the stacking of a rectangular parallelepiped 100. The illustrated parallelepiped has a single angle of skewness. This package shape has been found to provide sufficient numbers of degrees of freedom to allow modular parts with the same geometry, i.e., manifolds and printing elements, to be rearranged in different ways to permit an inkjet printer to form images with an adjustable print quality, accuracy, and size of swath.

Figure 2:
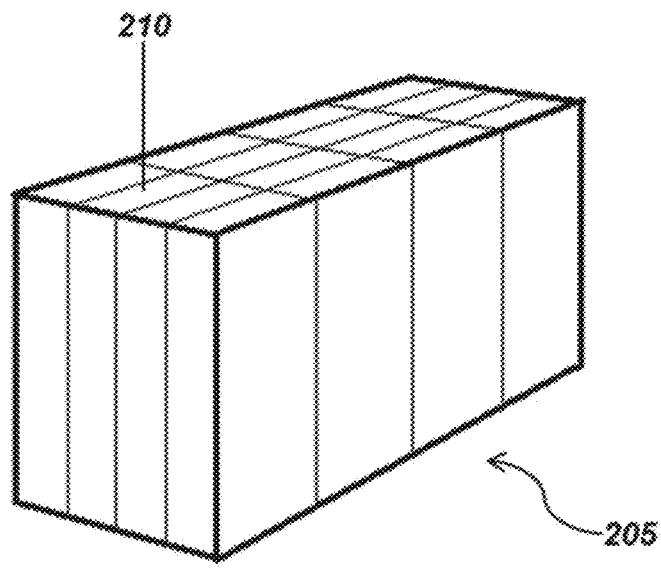
FIGS. 2-4 are schematic drawings illustrating the degrees of freedom present in stacked blocks.
Figure 3:
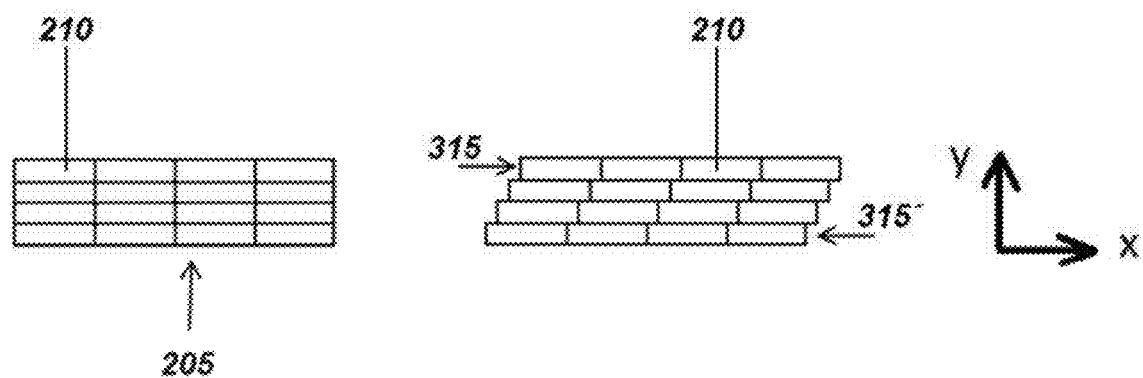
Figure 4:
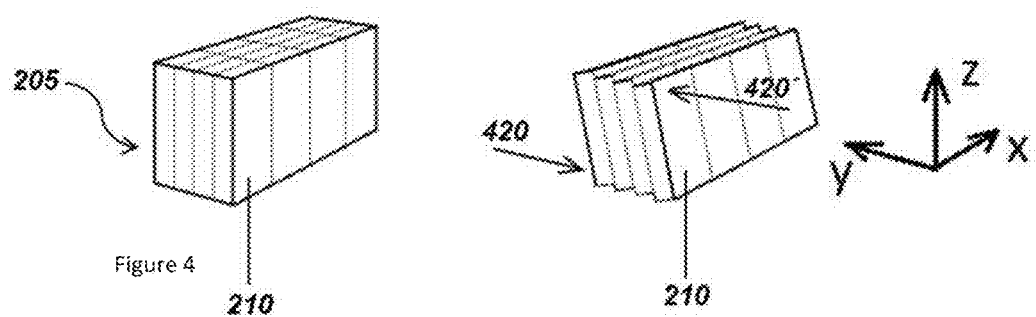

Referring to FIG. 2, the degrees of freedom mentioned above can be illustrated as follows. Consider a stack of sixteen identical rectangular bricks 210, such as books, stacked in a 4×4 pattern 205. Referring to FIG. 3, these books 210 can be shifted in two different ways independently. Looking from the top, the stack may be shifted by shearing in a horizontal 315, 315', or x direction, parallel to one edge of the stack 205. Referring to FIG. 4, in addition, the group of books may be shifted by shearing in a vertical plane 420, 420' perpendicular to the x-direction, i.e., the y-z plane. These two modes of displacement are independent and do not exclude one another by interference of the surfaces of the individual blocks 210 as long as the outer surfaces of the blocks are predominantly planar faces of a parallelepiped or possess interlocking contours that incorporate the necessary displacement.

In inkjet printing, a well-known technique of 'sabering' is used to enhance the resolution of an array of active jets in a traveling inkjet printhead. This is described below.

Figure 5:
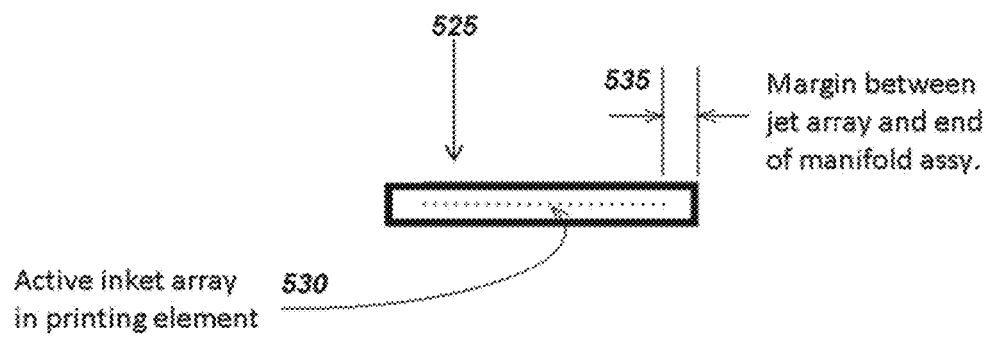
FIG. 5 is a schematic drawing illustrating an inkjet array in a printing element disposed in a manifold in accordance with the present disclosure.

Referring to FIG. 5, a typical inkjet printing element 525 has an array of jets 530 that emerge from an area disposed on one face of the printhead, called the orifice plate. Most typically, the jets 530 cannot extend to the ends of the printing element 525. Margins 535 usually exist at the edges of the element 525.

Figure 6:
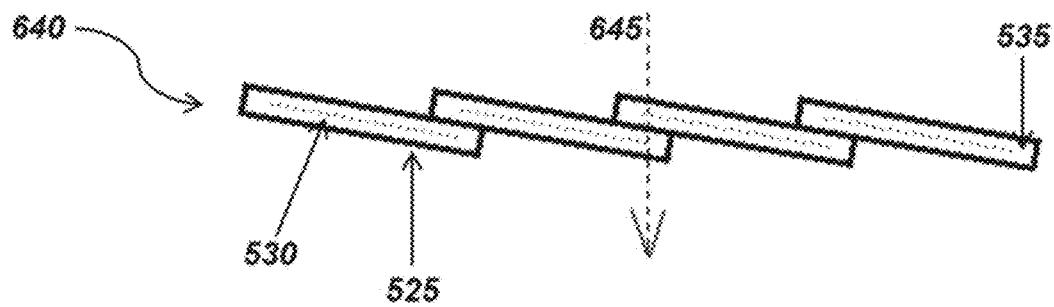
FIG. 6 is a schematic drawing illustrating a stacking pattern of several printing elements in accordance with the present disclosure.

Referring to FIG. 6, to group several printing elements 525 so that they print in a continuous swath, printhead designers may arrange the printing elements 525 in a 'sawtooth' array 640. The heads overlap across the printing direction 645 so that a margin 530 at an end of any single printing element 525 may be overprinted by the jets 530 of an adjacent printing element 525.

Figure 7:
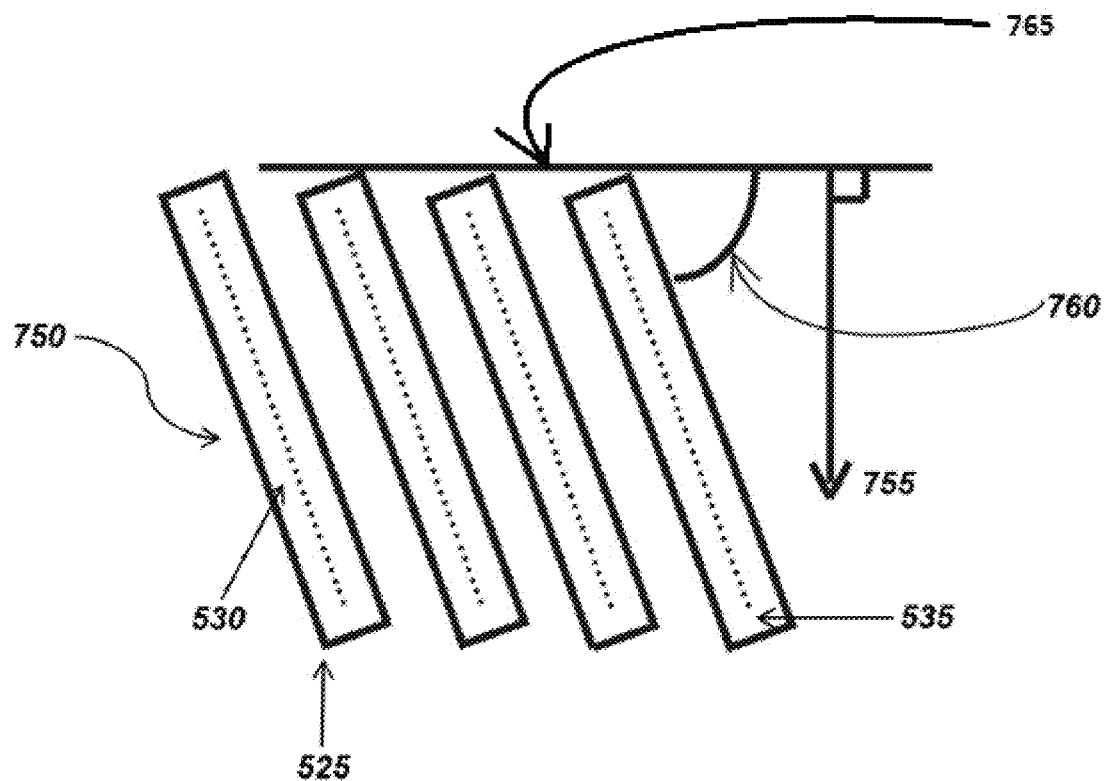
FIG. 7 is a schematic drawing illustrating a saber angle defined by several stacked printing elements.

Referring to FIG. 7, a second arrangement, i.e., a stack 750 of the same printing elements 525 permits them to travel in a direction 755 whereby the effective spacing between individual jets is reduced by a factor determined by the "saber" angle 760.

As used herein, the saber angle 760 is the angle between a line defined by an array of jets 530 on an inkjet printhead, i.e., a displacement axis 765 of the stack 750 of printing elements 525, and the direction of travel 645, 755 of the printhead. If the saber angle is 0 degrees, then the printhead travels perpendicularly to the row of jets 530. If the saber angle is greater than 0 degrees, the printhead makes an oblique angle to the direction of travel. In this case, each jet traces a path separated by a distance smaller than the true distance between jets. For example, if a printhead has a distance D between jets of 254 micrometers (coinciding with 100 dots per inch, or DPI) and the saber angle SA is 60 degrees, the spacing between the traces left by the jets is D cos(SA) or 127 micrometers, or 200 dots per inch. The effective spacing between jets is therefore D cos(SA) because the traces left by each jet are spaced closer than the true distance between jets. See, e.g., Inkjet-Based Micromanufacturing, Vol. 9 by Oliver Brand, Gary K. Fedder, Christofer Hierold, Jan G. Korvink, Osamu Tabata John Wley & Sons, Apr. 16, 2012, p. 69 and U.S. Pat. No. 8,851,616, Col. 8, Lines 12-27; both references incorporated herein by reference in their entireties.

A ratio between the effective distance between jets and the true distance between jets is given by the cosine of the saber angle. Because of the configuration in FIG. 7 has a much larger saber angle then the configuration of FIG. 6, the paths taken by adjacent jets in the printing direction are separated by a lateral distance much smaller in the configuration in FIG. 7 than they are in FIG. 6, increasing the resolution of the printer. This desirable industry technique is facilitated by the manifold design in accordance with embodiments of the invention, as described below, that facilitates the close stacking of printing elements disposed in the manifold.

Due to the additional degree of freedom illustrated in FIG. 4, one may incorporate a tilt between 2 and 20 degrees from the vertical, most preferably 10 degrees, in the array of printing elements 640, 750. This tilt may have a benefit in some machines of expelling dust and other ejected material away from the printing elements 525, thereby enhancing reliability in aggressive dusty environments. See, e.g., U.S. Patent Application No. US2015/0251354, incorporated herein by reference in its entirety.

Figure 8:
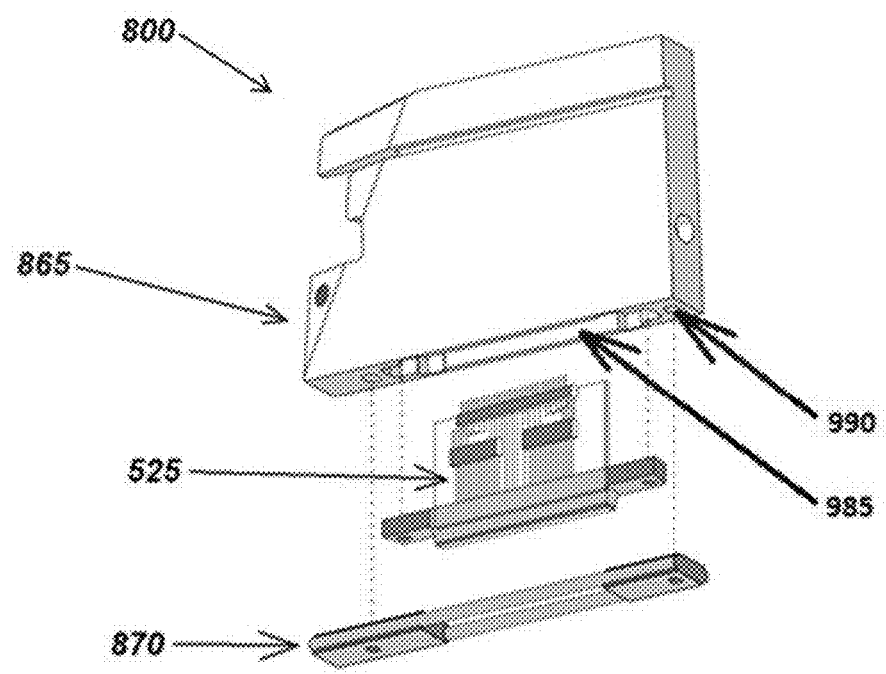
FIG. 8 is a schematic drawing of an inkjet printhead in accordance with the present disclosure.

Referring to FIG. 8, a typical inkjet printhead assembly 800, i.e., a printing apparatus in accordance with an embodiment of the invention, includes a printing element 525, a manifold 865, and a gasket 870. The manifold 865 may be manufactured in a simple geometric shape, i.e., a parallelepiped, and may be customized through subsequent machining operations to best suit a particular printhead design.

Figure 9:
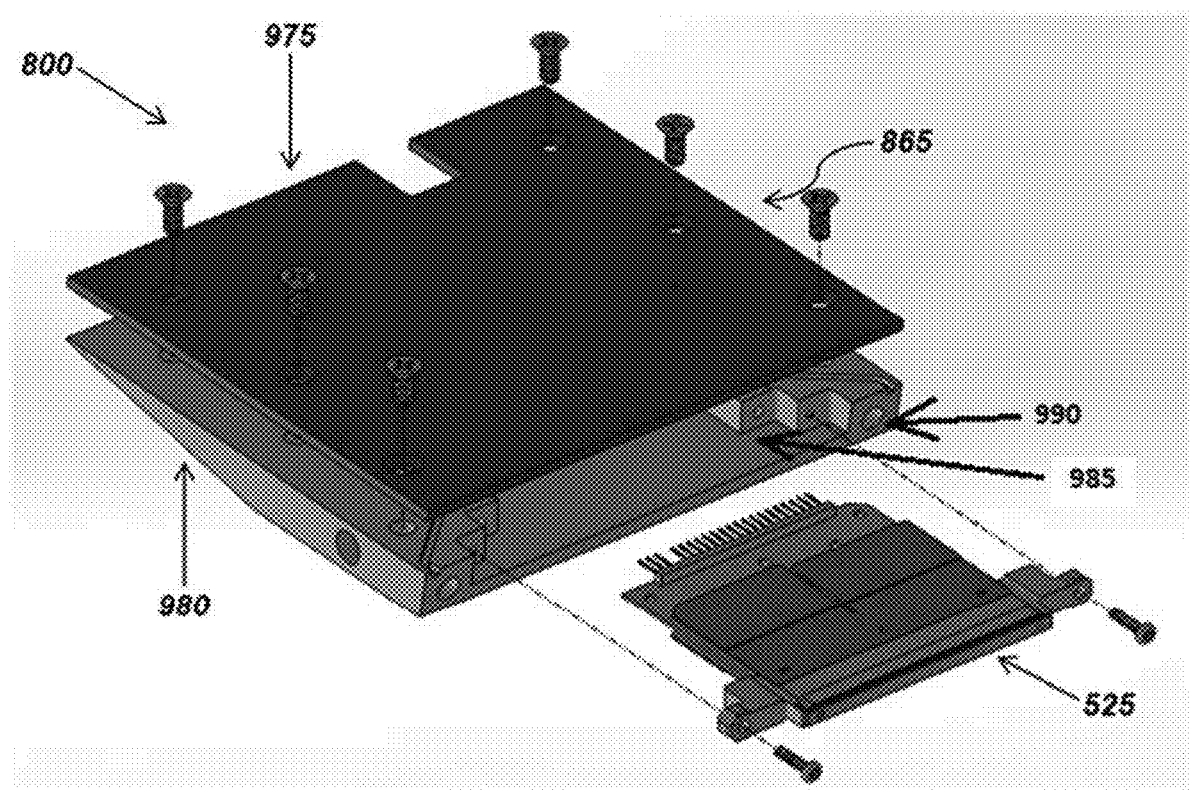
FIG. 9 is a schematic drawing of an inkjet printhead in accordance with the present disclosure.

The manifold may be fabricated from a single piece of material, or it may be formed as a sandwich of several pieces, to facilitate manufacture. For example, in a typical manufacturing sequence, the manifold 865 may be fabricated, by, e.g., machining or by molding a block into a shape approximating that of a rectangular parallelepiped 100. Alternatively, as shown in FIG. 9, the machining process may include machining a plurality of components, including a top plate 975 and a bottom plate 980, that are assembled and fastened with, e.g., screws, to form the parallelepiped. The manifold 865 can be made of any material or combination of materials that satisfies the following requirements: (i) chemically compatible with the fluids printed through the printing elements 525; (ii) mechanically stiff enough to support the mounting of the printing element 525; and (iii) machinable or moldable. A preferred material for this component is a plastic material that resists the solvent action of the ink printed through the printhead. Examples are polypropylene, nylon, PVDF, PTFE, PEEK, polysulfone, epoxy, and polyvinyl chloride.

The manifold block may define slots and other incised features to accommodate the mounting of a printing element 525, electronic connectors to the printing element 525, and fluid connections to the printing element 525. Because of the peculiarities of the designs of printing elements 525 available from various manufacturers, these blocks may preferably have two faces broader than the other four, allowing the definition of custom slots and incised features.

A bottom portion of the manifold may define a slot 985 configured to accommodate insertion of a printing element. The manifold is preferably sufficiently larger than the printing element to permit effective mounting and stacking of the elements in the assembly. For example, the Fujifilm/Dimatix printing elements are approximately 4.5 inches long and 3.25 inches tall. Accordingly, the manifold length is preferably greater by enough of a margin to allow for screws to be incorporated for mounting. In some embodiments, a manifold length of 6 inches or greater is preferred. The height of the manifold is preferably greater than a height of the printing element, such that the printing element may be entirely enclosed. The width may be determined by the length of the jet array and the largest saber angle that is desired, within the constraint that it be larger than the width of the printing element. For example, for a 100 DPI Fujifilm/Dimatix printhead with a jet array length L equal to 2.56 inches, tilted at an angle TA of 10 degrees to the vertical, and a desired effective DPI of 300, the saber angle SA is 70.53 degrees. The maximum width in this example is L*sin(SA) *cos(SA)*cos(TA)=0.792 inches. More practically, it may be desirable to overlap the paths of the jet arrays and provide for some clearance between manifolds in the stack, so the figure calculated above represents an upper bound to the width.

The displacement between manifolds in a stack may allow for overlap between jet paths at coinciding ends of adjacent arrays, and may be equal to (L−(n*P))*cos(SA) where n is the number of jets to overlap between printhead arrays and P is the pitch, or distance between individual jets (254 micrometers in the example above.)

In some embodiments, the manifold may define one or more electrical connection slots configured to allow attachment of electrical connections. The electrical connection slot(s) may be arranged on a top face of the parallelepiped opposite the bottom face.

The heating elements for controlling the printhead temperature may be miniature surface-mount electronic components including ceramic-substrate power resistors, thermistors and voltage regulators, delivering a power output of 2-10 watts and fitting into a package of about 8 mm×14 mm×2 mm. These heaters may regulate to a fixed temperature, most preferably between 40 and 50 degrees Celsius, or they may be controllable via temperature feedback to printhead control circuitry. In some embodiments, they fit into slots provided in the wings of the manifold, and are sprung against the body of the printing element.

Cooling elements may be solid-state Peltier devices, or they may include tubular heat exchangers that allow the passage of a heat-transfer medium such as chilled water. These devices may be compressed to the same size as the example given above and sprung against the printing elements as described above.

Figure 10:
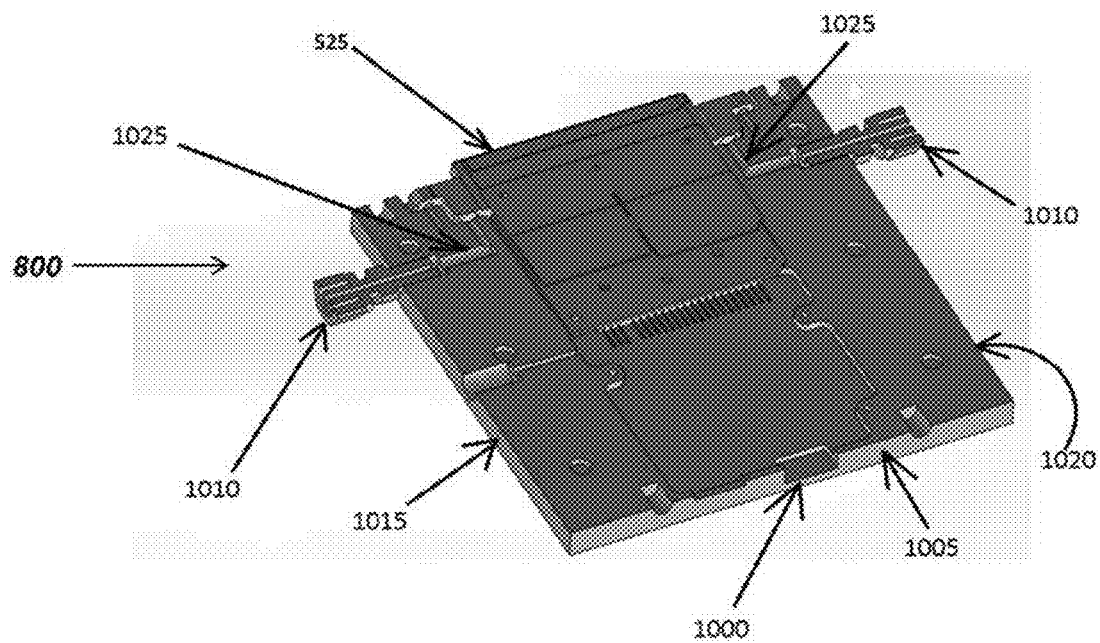
FIG. 10 is a schematic drawing illustrating a sectional view of a printing element disposed in a manifold with fluid fittings and fluid channels in accordance with the present disclosure.

Typically, it is not necessary to provide both heating and cooling elements to the same package. Fluid supplied to the printhead arrives at an ambient temperature that may be either above or below the required service temperature. By way of example, if the fluid ambient temperature is below the desired service temperature, the fluid tends to cool the printing element, and accordingly it may be necessary to supply heat to maintain the printing element at the desired temperature Referring to FIGS. 9 and 10, in embodiments of this invention, different components of the assembled printing apparatus, i.e., of the printhead 800 are brought together from different directions that are favored by the modes of stacking illustrated in FIGS. 3 and 4. In other words, functional features of the manifold may be arranged as follows to allow flexibility in stacking of the manifolds when assembled with printing elements.

1. The slot 985 shaped to accommodate the printing element passes into the block is preferably formed in the narrow face at the bottom 990 of the manifold. The bottom 990 is defined by the downward direction in which the jets generally project, especially in 3D printers. The printhead may further be covered by a gasket attached over the same narrow face.
2. An electrical connection slot 1000 accommodating the electronic connections to the printing element may pass through the top face 1005 of the manifold, opposite the bottom face. The electrical connection slot may be slightly tilted from the true vertical because of a tilt in the printing array, shown in FIG. 4. Electronic connections to the printing element may be further facilitated by incorporating a small printed-circuit board into the slot also occupied by the printing element. The mechanical support provided by the manifold allows the printing element and any additional circuitry to be secured inside a rugged package.

3. Fluid connections 1010 communicating with the printing element may be made to the two remaining narrow faces 1015, 1020 of the manifold, the 'ends.' Fluid communicates with the printing element through channels 1025 machined or molded into the body of the manifold.

Figure 11:
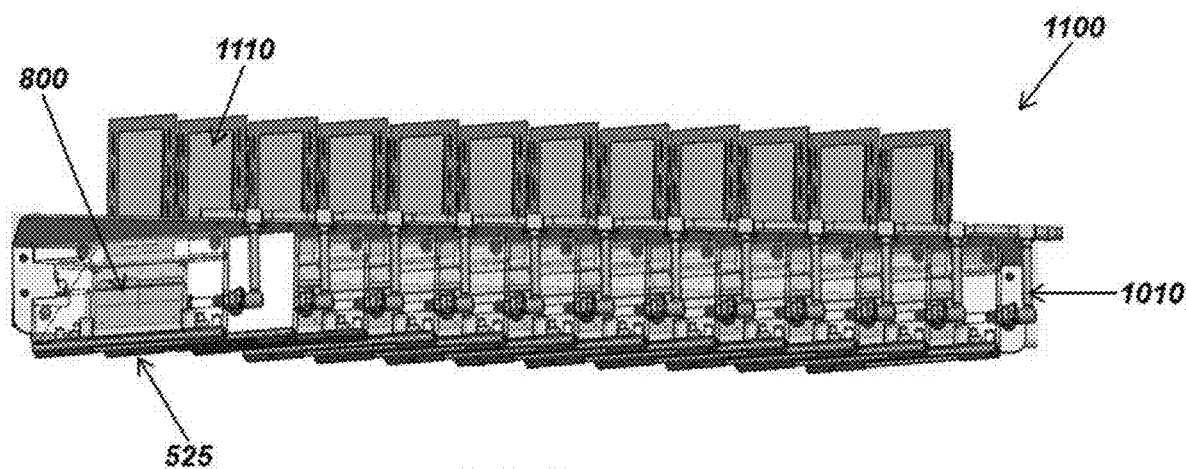
FIG. 11 is a schematic drawing illustrating a stack of twelve printhead assemblies with electronic and fluid connections in accordance with the present disclosure.

Referring also to FIG. 11, an array 1100 of printheads 800 are arranged in a stack. Each printhead includes, as discussed above, a printing element 525 and a fluid connection 1010. Electrical connections 1110 are connected to each printhead 800.

By placing connections for electronics and fluids on different faces with sharp edges, fluid that may be spilled while closing and opening fluid connections is kept away from the electronic components of the printhead. These include the electronic components integrated directly with the printing element, those integrated with external circuit boards as well as connectors and cables interfacing between them. Further, by preserving the outside shape of a rectangular parallelepiped (as shown in FIG. 1) the geometric freedom is preserved to allow printing elements to be grouped in a wide variety of patterns as described above.

Custom features may be machined into the manifold for mechanical mounting, electronic connection, and fluid connection. For example, if a grouping of printing elements is desired with a particular effective jet spacing to achieve a certain degree of spatial resolution, the manifolds may be mounted onto a mechanical support that is preferably fabricated in a simple shape, such as a right-angle bracket. The orientation of the manifolds with respect to the mounting bracket may be some angle that deviates from a right angle. In an example given above, manifolds may be mounted at 19.47 degrees to the direction of travel (a "saber-angle" of 71.53 degrees) with a tilt of 10 degrees from the vertical. To simplify the construction of the frame that holds these manifolds to the robot, the right-angle bracket that supports them is preferably perpendicular to the major structural frame of the printhead. This frame may be oriented perpendicular to the direction of travel. Therefore flat surfaces may be machined into the manifolds to provide mounting surfaces that interface with the bracket. These flat surfaces may be made at the angles listed above. Manifolds initially constructed as rectangular parallelepipeds and held as stock components may be customized by being machined with angled surfaces to accommodate the particular design, as well as having screw holes cut in them for mounting.

Since both the transmission of fluids and electronic signals involve the grouping of extended lines of supply (i.e., tubes in one case and wires in the other) embodiments of this invention facilitate easy design by projecting these lines in different directions away from the manifold. Thus, hoses and fittings may be grouped off to the side of a single row of manifolds, while circuit boards and cables may be grouped on top. This helps the electronics stay dry since the electronics are generally situated above the fluid connections.

The presence of fluid connections on the ends of the manifolds restricts the grouping of printing elements to one or more separated rows. This restriction in no way limits the geometric degrees of freedom shown in FIGS. 3 and 4. Fluid connections may be confined to margins between parallel rows of manifolds, but the manifolds themselves may still be tilted and shifted in the ways shown.

Modular components in this simple shape may be manufactured economically as stock components in a simple angular external shape containing just a slot for a particular style of printing element (e.g., a Fujifilm/Dimatix Q-series industrial inkjet printhead) and held in inventory for later customization. When a printing system is specified with a desired printing resolution, the saber and tilt angles at which the manifolds are mounted are determined. Mounting features may be machined into the stock components to hold them at these particular angles relative to the printing direction and/or relative to a mechanical component of a printer, such as a gantry or a robotic manipulator. At the same time, a slot or several slots may be machined for whatever electronic connectors are preferred. Additionally, connections for fluids may be machined to suit whatever particular style is required to properly channel the fluid components for the particular application.

Accordingly, the parallelepiped shape of the manifold of embodiments of the invention is not a mere design choice; rather, it provides various tangible benefits, not only for flexibility in positioning of printing elements on a printhead depending upon the desired printing resolution, but also for storage and customized manufacturing.

As a further enhancement of this modular design, compact heating or cooling elements may be incorporated into the stock manifold to facilitate temperature control in locations most beneficial to the particular style of printing element in use.

Those skilled in the art will readily appreciate that all parameters listed herein are meant to be exemplary and actual parameters depend upon the specific application for which the methods and materials of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A printing apparatus, comprising:
a manifold shaped as a rectangular parallelepiped having three pairs of parallel faces including a bottom face and comprising
a body thereof defining a plurality of fluidic channels, the bottom face defining a slot configured to accommodate insertion of a printing element; and
at least one face from among the three pairs of parallel faces defining a plurality of fluidic connections in fluidic communication with the fluidic channels, wherein the manifold is configured to travel along a travel axis, and the bottom face is oriented at a non-orthogonal angle relative to the travel axis, such that when a printing element is disposed in the manifold and dispenses liquid, the liquid is dispensed at the non-orthogonal angle relative to the travel axis.

2. The printing apparatus of claim 1 wherein at least one pair of parallel faces defines a non-right angle to at least one other pair of parallel faces.

3. The printing apparatus of claim 1, further comprising:
a gasket mounted on a bottom surface of the manifold and covering the slot.

4. The printing apparatus of claim 1, further comprising the printing element disposed in the manifold.

5. The printing apparatus of claim 4, further comprising a plurality of manifolds and printing elements, wherein the manifolds are stacked on each other to define a stack such that at least one set of parallel faces of each manifold is tilted away from a displacement axis of the stack.

6. The printing apparatus of claim 5 wherein two sets of parallel faces of each manifold are tilted away from the displacement axis.

7. The printing apparatus of claim 1 wherein the manifold further defines one or more electrical connection slots configured to allow attachment of electrical connections.

8. The printing apparatus of claim 7 wherein the parallelepiped has a top face, the bottom face opposite and spaced apart from the top face along a first axis, a front face opposite and spaced apart from a back face along a second axis, and two end faces opposite one another and spaced apart along a third axis, the top face and the bottom face have a width along the third axis and a depth along the second axis, the front face and back face have a width along the third axis and a height along the first axis, the end faces have a width along the second axis and a height along the first axis, the depths of the top face and the bottom face are less than the widths of the front face and the back face, the at least one face from among the three pairs of parallel faces defining a plurality of fluidic connections is at least one of the two end faces, and the electrical connection slots are arranged on the top face.

9. The printing apparatus of claim 1 wherein when a print head having a plurality of orifices arranged along a first axis is installed in the manifold, the end faces have respective widths along a second axis less than a width of a front face along the first axis and a width of a back face along the first axis, and the fluidic connections are arranged on one of the end faces of the parallelepiped.

10. The printing apparatus of claim 1, further comprising:
a heating element mounted inside the manifold, configured to communicate heat to the printing element.

11. The printing apparatus of claim 10 wherein the heating element is embedded in the manifold during manufacture of the manifold by a molding process.

12. The printing apparatus of claim 1, further comprising:
a cooling element mounted inside the manifold, configured to cool the printing element.

13. The printing apparatus of claim 12 wherein the cooling element is embedded in the manifold during manufacture of the manifold by a molding process.

14. A stacked printing apparatus assembly, comprising:
a plurality of the printing apparatuses of claim 1 connected to and spaced apart from one another along a stacked assembly length axis, wherein the bottom faces of each of the printing apparatuses are oriented at a non-orthogonal angle relative to the travel axis.

15. The stacked printing apparatus assembly of claim 14, wherein the stacked printing apparatus assembly is operable to move the plurality of printing apparatuses along the travel axis, and the bottom faces of the printing apparatuses are not parallel to the travel axis.

16. The stacked printing apparatus assembly of claim 15, wherein the three pairs of parallel faces comprise a back face opposite from and parallel to a front face, and the back face is oriented at an angle of from 88 to 70 degrees relative to the travel axis.

17. The stacked printing apparatus assembly of claim 14 wherein the three pairs of parallel faces each comprise a back face oriented at an oblique saber angle relative to the stacked assembly length axis.

\* \* \* \* \*